(12) United States Patent
Kitazawa et al.

(10) Patent No.: US 6,916,011 B2
(45) Date of Patent: Jul. 12, 2005

(54) BALL VALVE AND PRODUCTION METHOD THEREFOR

(75) Inventors: Shigeo Kitazawa, Yamanashi (JP); Chikashi Gomi, Yamanashi (JP)

(73) Assignee: Kitz Corporation, Chiba (JP)

( * ) Notice: Subject to any disclaimer, the term of this patent is extended or adjusted under 35 U.S.C. 154(b) by 110 days.

(21) Appl. No.: 10/182,552

(22) PCT Filed: Feb. 2, 2001

(86) PCT No.: PCT/JP01/00763

§ 371 (c)(1),
(2), (4) Date: Jul. 30, 2002

(87) PCT Pub. No.: WO01/57423

PCT Pub. Date: Aug. 9, 2001

(65) Prior Publication Data

US 2003/0001125 A1 Jan. 2, 2003

(30) Foreign Application Priority Data

Feb. 3, 2000 (JP) ........................ 2000-026071
Apr. 14, 2000 (JP) ........................ 2000-114187

(51) Int. Cl.⁷ ............................................. F16K 5/06
(52) U.S. Cl. ........................ 251/315.13; 137/15.22; 29/890.13
(58) Field of Search ............... 251/315.1, 315.13, 251/315.14, 315.15, 288; 137/15.22, 315.18, 315.19; 29/890.12, 890.124, 890.126, 890.13

(56) References Cited

U.S. PATENT DOCUMENTS 2,573,177 A * 10/1951 Bohlen ................. 251/315.15
3,490,734 A * 1/1970 Freeman ................ 251/315.15
3,584,833 A * 6/1971 Grenier ................. 251/315.14
3,819,149 A * 6/1974 Kinder .................. 251/315.15
4,545,564 A * 10/1985 Krosoczka et al. ..... 251/315.15
4,546,790 A * 10/1985 Huber et al. .......... 251/315.15
5,586,749 A * 12/1996 Conley et al. ......... 251/315.15
5,890,286 A * 4/1999 Eklof ...................... 29/890.13

FOREIGN PATENT DOCUMENTS

| JP | 62-165081 | 7/1987 |
| JP | 63-266276 | 11/1988 |
| JP | 10-122390 | 5/1998 |

* cited by examiner

Primary Examiner—Eric Keasel
(74) Attorney, Agent, or Firm—Wenderoth, Lind & Ponack, L.L.P.

(57) ABSTRACT

The invention provides a ball valve excelling in economy due to the efforts devoted to the reduction of cost, enjoying light weight and high reliability, manifesting high and uniform accuracy, and enabling manufacture of compact finished products having a small interface dimension, and provides a method for the production of the ball valve. The ball valve includes a body formed from a pipe having a predetermined length by subjecting opposite terminal parts (ends) of the pipe to a plastic processing including flaring and diametrical contraction. The body has at a central position a seat-shaping part (seat) formed with a stem-inserting hole, a stem inserted into the stem-inserting hole, a ball disposed non-rotatably at a lower terminal of the stem, and a pair of inserting members having an annular shape forced into the body from opposite terminals of the body. Opposite terminal faces of the body are compression-formed so that the pair of inserting members receive and support the ball rotatably.

8 Claims, 16 Drawing Sheets

BALL VALVE AND PRODUCTION METHOD THEREFOR

TECHNICAL FIELD

This invention relates to a ball valve that is fitted in a pipe for cold or hot water, air or gas, and used therein to start, stop or control the flow of the relevant fluid, and to a method for the production thereof.

BACKGROUND ART

Generally, a forged or cast blank or a round bar material is cut to form a main body, and necessary internal parts are incorporated, screwed or bolted in the main body, thereby assembling ball valves of this class.

These ball valves, however, are expensive because they entail high material costs on account of large numbers of man-hours, high prices of blanks, and large numbers of component parts, and require high process costs for the cutting and the assemblage. They have comparatively great weights as well. Further, since the blanks for processed parts necessitate margins for machining in advance, the costs of materials inevitably increase proportionately.

To cope with these problems, the concept of forming a ball valve by resorting to the technique of press working utilizing a pipe has been proposed. (Refer to JP-A SHO 62-165081, JP-A SHO 63-266276 and JP-A HEI 10-122390.)

However, since the ball valve produced by the press working technique using a pipe has a construction such that it acquires a sealing property by having a ball tightened in a valve seat part, such as a ball seat, which is an elastic member during the assembly of the ball valve, the incorporation of internal components into the pipe necessitates a step of tentative assemblage using the internal components as an integral unit.

The ball valve, therefore, encounters the problem of adding a step of tentative assemblage and a step of dissolving the tentative assemblage, increasing the total number of steps of operation and boosting the cost of production.

Even if the tentative assemblage of internal components should be avoided, manufacturing ball valves uniformly with high accuracy as finished products by the technique under discussion has proved extremely difficult.

The screw connection is prevalently adopted generally for connecting a valve with a small diameter to a pipe. When the ball valve utilizing a pipe is joined to a pipe by the screw connection, since the construction of this ball valve requires a screw part different from the valve seat member to be welded to the terminal part of the body made of the pipe or fastened to the terminal part (expanded diametrically in advance) of the body made of the pipe, this screw connection incurs the problem of complicating the process of production of the ball valve and unduly elongating the interface dimensions of the valve.

This invention which has been developed in view of the problems mentioned above is aimed at providing a ball valve excelling in economy due to the efforts devoted to the reduction of costs, enjoying light weight and high reliability, manifesting high and uniform accuracy, and enabling manufacture of compact finished products having a small interface dimension, and is aimed at providing a method for the production of the ball valve.

SUMMARY OF THE INVENTION

To attain the above objects, the present invention provides a ball valve comprising a body formed from a pipe having a predetermined length, by subjecting opposite terminal parts of the pipe to a plastic processing including flaring and diametrical contraction. The body has at a central position a seat-producing part formed with a stem-inserting hole, a stem inserted into the stem-inserting hole, a ball disposed non-rotatably at a lower terminal part of the stem, and a pair of inserting members with an annular shape forced into the body from opposite terminals of the body. Opposite terminal faces of the body are compression-formed so that the pair of inserting members receive and support the ball rotatably. In the ball valve, the plastic processing is angular flaring work so that the body has angular opposite terminal faces, and the paired inserting members have similar angular outer peripheral faces.

The present invention also provides a method for the production of a ball valve, comprising cutting a pipe in a predetermined length, subjecting opposite terminal parts of the length of the pipe to plastic processing including flaring and diametrical contraction, thereby forming a body, forming a stem-inserting hole in seat producing parts formed at an approximately central position of the body, then forcing one of a pair of annular inserting members into the body from one side thereof, joining a ball non-rotatably to a lower terminal of a stem inserted into the stem-inserting hole, forcing the other of the pair of inserting members into the body from the other side thereof, and causing the pair of inserting members to receive and support the ball rotatably, with a predetermined allowance for tightening furnished for the ball, while compression-forming opposite terminal faces of the body.

The present invention further provides a ball valve having a construction comprising a predetermined length of a pipe having stem-inserting holes at an approximately central position of the pipe, stems inserted in the stem-inserting holes, a ball joined non-rotatably to lower terminals of the stems, and a pair of annular inserting members set on inner peripheries of opposite terminals of the pipe. Opposite terminal faces of the pipe are diametrically contracted or compressed to join the pair of inserting members to the pipe and cause the pair of inserting members to receive and support the ball rotatably.

The present invention further provides a method for the production of a ball valve, comprising cutting a pipe in a predetermined length, forming stem-inserting holes in the pipe at an approximately central position thereof, inserting stems into the stem-inserting holes, setting a ball in a non-rotatable manner to lower terminals of the stems, setting a pair of annular inserting members to inner peripheries of opposite terminals of the pipe and causing the pair of inserting members to receive the ball from opposite sides of the pipe and rotatably support the ball, and diametrically contracting or compressing the opposite terminals of the pipe until the inserting members and the pipe are joined.

The present invention further provides a method for the production of a ball valve, comprising cutting a pipe in a predetermined length, forming stem inserting holes in the pipe at an approximately central position thereof, setting an annular inserting member on an inner periphery of one of opposite terminals of the pipe, and diametrically contracting or compressing the one terminal of the pipe, thereby fixing the inserting member. Stems are then inserted into the stem-inserting holes, and a ball is non-rotatably joined to lower terminals of the stems. Thereafter, another annular inserting member is set on an inner periphery of the other terminal of the pipe, thereby causing the pair of inserting members to receive and support the ball rotatably, and the other terminal of the pipe is diametrically contracted or compressed against the other inserting member, thereby joining the other inserting member and the pipe.

The present invention further provide a ball valve comprising a pipe of a predetermined length having stem-inserting holes formed therein and terminals diametrically contracted to form seal-retaining parts, a pair of seal rings (one of which is set in one of the seal-retaining parts) stems inserted into the stem-inserting holes, and a ball joined non-rotatably to a lower terminal of the stems. The ball has one side thereof colliding with the one seal ring, and the other of the seal rings is allowed to collide against the other side of the ball. An insert ring is incorporated on a rear terminal side of the other seal ring, and the other seal ring and the insert ring are retained by the other of the seal-retaining parts.

The present invention further provides a method for the production of a ball valve, comprising cutting a pipe in a predetermined length, diametrically contracting terminals of the pipe, thereby forming seal-retaining parts of a tapered shape and stem-inserting holes. One of a pair of seal rings is set on one of the seal-retaining parts, then a ball is joined to a stem inserted into one of the stem-inserting holes, thereby allowing one side of the ball to collide against the one seal Subsequently, the other of the pair of seal rings is set on the other side of the ball, an insert ring is incorporated in the other seal ring on the rear terminal side thereof, and then the other of the seal-retaining parts is caused to set and retain the other seal ring and the insert ring.

According to this invention, therefore, the attempt to allow the product a decreased weight can be fulfilled because the product using an inexpensive pipe as the blank for its main body has a lighter weight than the conventional cast or forged product. Since the product of this invention requires no cutting step as compared with the conventional products which require cutting steps for the sake of their main bodies, lids and various joined parts, it permits a marked decrease in the time for production and adapts itself for mass production as well. As a result, the cost of production can be greatly lowered, and a ball valve veritably excelling in economy can be produced. Further, the ball valve to be obtained by this invention enjoys inexpensiveness and has increased reliability because it uses a body of one-piece construction and has joined portions and component parts in very small numbers.

The ball valve can manifest a sealing force and an operating torque stably because it is formed by expanding the diameter and contracting the diameter of a given pipe. Since insert members are forced in as pressed at the opposite terminals thereof, and the pressure welding of a ball seat to a ball is attained by uniform exertion of pressure, the ball valve to be obtained as a finished product enjoys high accuracy.

Further, since various members, such as the insert members and the ball, can be inserted into the body and readied for assemblage without requiring tentative assemblage, the time for assemblage is shortened. Since the insert members are not required to be furnished with portions for securing mutual distances, the ball valve to be obtained has a decreased weight, and the insert members incorporated therein can easily assume various states of needed contact and facilitate adaptation of a product.

The ball valve, despite the use of a pipe, does not need to elongate the interface dimension. Thus, the ball valve is obtained in a compact construction composed of only a small number of components.

In the invention described above, the ball valve is configured by performing a burring work on a stem-inserting hole to form a tubular part and a stopper piece projecting from part of the tubular part, while forming a notched groove for regulating rotation in a flange part disposed on a stem. Thus, the stopper piece to come into working contact with the notched groove to regulate the rotation of a ball, an O-ring fitted in a fitting groove of the stem can contact the inner wall surface of the tubular part, and a stepped part can be formed on the upper edge part of the tubular part and packing can be fitted in the stepped part.

Since the consequent impartation of the function of a stopper to the interior of the body contributes to attainment of compaction of the product and reduction of the cost of production and results in integrating the body with the stopper function, the ball valve produces an open-shut motion with increased accuracy and allows the handle of the valve. to operate with a simple construction. Thus, the ball valve enjoys high yield of production and veritably excels in mass-producibility. Further, this invention warrants production of a ball valve that adapts to widely-varied characteristics (temperature, pressure, etc.) of a fluid and exhibits an ideal sealing property.

DETAILED DESCRIPTION OF THE INVENTION

Figure 1:
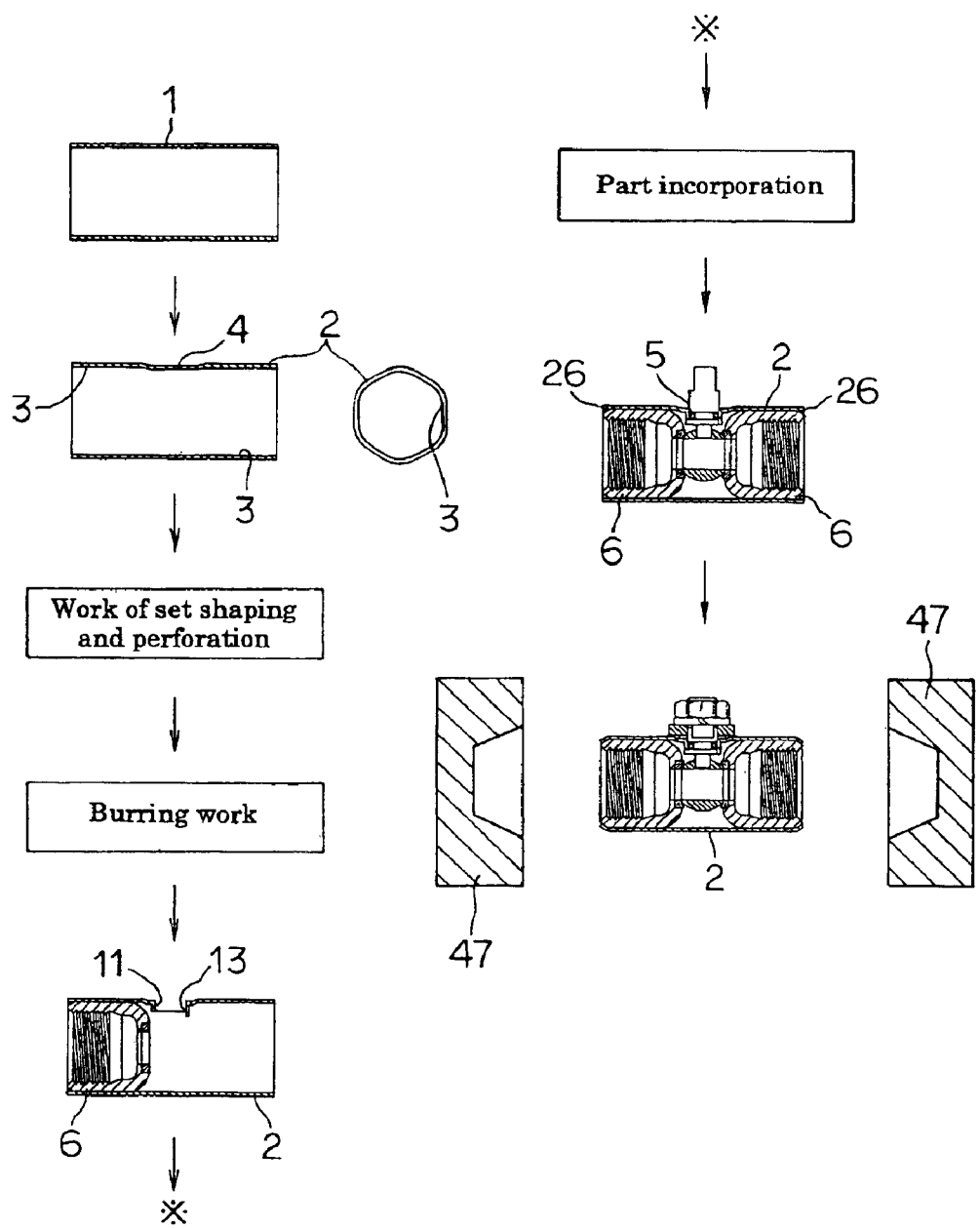
FIG. 1 is an explanatory diagram illustrating a method for the production of a ball valve in the first aspect of this invention.

This invention will be described more specifically below with reference to the accompanying drawings. For purposes of this description, the term "inner" means closer to the center of the valve with respect to a central axis of the valve body (i.e., the axis along which flow occurs), while "outer" means farther from the center of the valve.

FIGS. 1 through 10 are intended to illustrate a method for the production of a ball valve as contemplated by the first aspect of this invention.

In the diagrams, reference numeral 1 denotes a pipe. This pipe 1 is a thin-wall (non-thick-wall) type seamless pipe of copper alloy or stainless steel. Otherwise, it may be a seamed pipe 1 produced by shaping a steel plate in the form of a roll and then converting the roll into a cylinder by joining the opposed edges of the roll as by welding. A body 2 of a ball valve is formed by cutting a predetermined length of this pipe 1, namely the length of a prospective valve box of a ball valve, deburring the opposite ends of the length of the pipe severed by cutting, and then subjecting the opposite parts of the pipe 1 to the work of flaring. The flaring work in this case consists of plastic processing an angular (hexagonal, for example) forcing retaining part 3 that assumes a radial plane. Further, the central position of the body 2 is constricted or beaten to form a flat seat-shaping part 4, and a stem-inserting hole 5 is formed in the internal region of the seat-shaping part 4.

Figure 2:
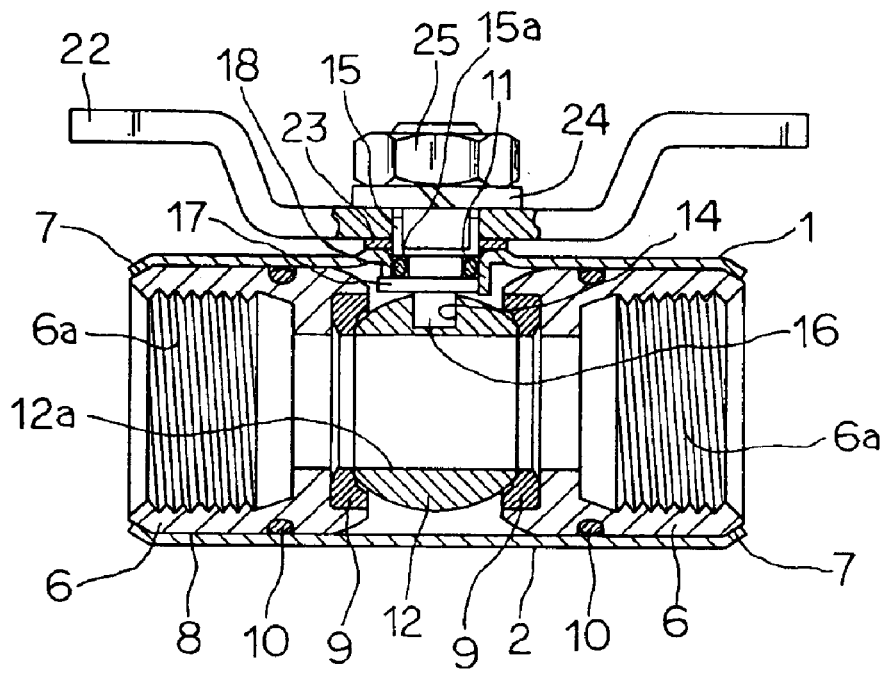
FIG. 2 is a cross section illustrating the ball valve in the first aspect of this invention.

With reference to FIG. 2, reference numeral 12 denotes a ball furnished with a through hole 12a. This ball 12 has a stem fitting face 14 formed at the position for setting a stem 15. By joining a non-circular projecting part 16 formed at the lower terminal of the stem 15 to the stem fitting face 14, the ball 12 and the stem 15 can be joined in a non-rotary state (i.e., those parts do not rotate with respect to each other). A flange part 17 formed in the lower part of the stem 15 prevents the stem 15 from being flung out by the pressure of a fluid.

Reference numeral 22 denotes a handle. This handle 22 is fixed in a non-rotary state to the stem 15 and clamped fast with a nut 25 through a spring washer 24 and a washer 23 disposed respectively in the upper and the lower part of the handle 22.

Numerals 6, 6 denote an example of a pair of annular insert members. These insert members 6 are symmetrically incorporated bilaterally relative to the ball 12. The insert members 6 each retain on the inner peripheral side of the leading terminal part thereof a seat ring 9 endowed with a sealing property. Due to a sealing member (O ring) 10 made of resin and set on the outer periphery of insert member 6, each insert member can perform the function of a gasket against the inner peripheral face of the body 2.

The insert members 6 are each formed either by rolling a thick-wall pipe or a thick-wall plate, then joining the opposed edges of the roll as by welding, thereby giving rise to a metallic tube, and cutting the tube by rolling or press working or by drawing a thick-wall plate material into the shape shown in the diagram by the press working. Otherwise, they may be formed by precision casting, such as the lost-wax process, or by sintering a metallic powder.

Further, the insert members 6 contemplated by this invention possess such a thickness as to manifest fully satisfactory strength during the course of joining, and also possess fully satisfactory strength to withstand the force exerted during the forced insertion into the pipe 1. That is, the ball valve of this invention is directed toward allocating functions, decreasing weight and compacting construction by adopting a configuration which derives the strength necessary for a pressure vessel mainly from the body 2 formed of a thin-wall pipe 1 and the strength to withstand the impact of joining pipes or of effecting the forced insertion into the pipe 1 or the strength necessary for maintaining the bearing stress between the ball 12 and the seat ring 9 mainly from the insert member 6 which is a thick-wall part. The insert members 6, 6 are each furnished at the terminal end thereof on the opposite side relative to the ball 12 with a tapered part 7 disposed at a suitable angle along the respective angularly shaped outer peripheral faces 8, 8. These insert members 6 may be endowed with a suitable form of union, such as a female thread 6a that is used in the present case. Thus, the body 2 may have suitably-incorporated therein a portion for union, such as a female thread, without requiring an alteration in the length of the body 2 which is formed of a predetermined length of the pipe 1.

Figure 3:
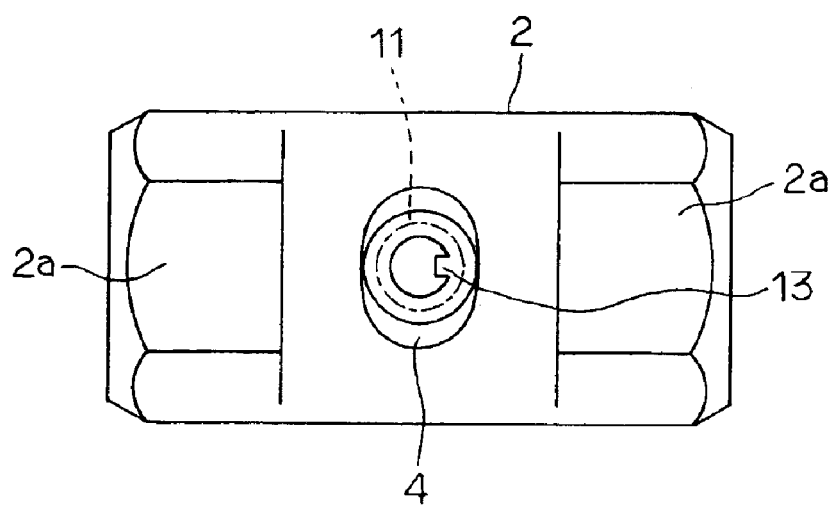
FIG. 3 is a plan view of the body shown in FIG. 2.
Figure 6:
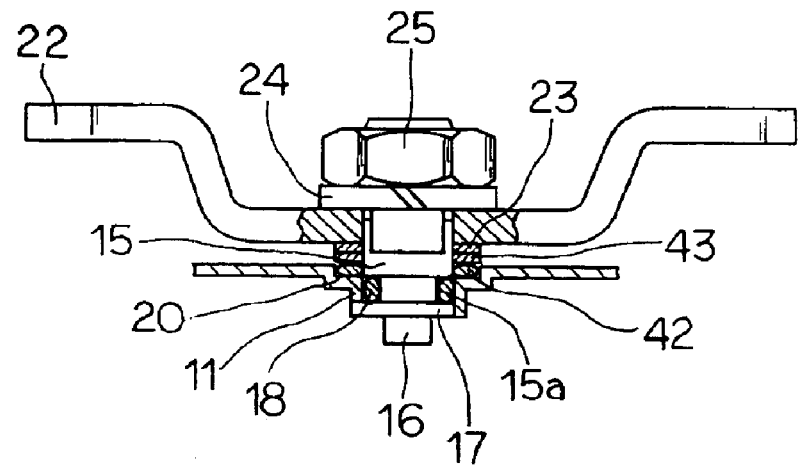
FIG. 6 is a cross section illustrating an example of providing a body. with a stepped part.
Figure 7:
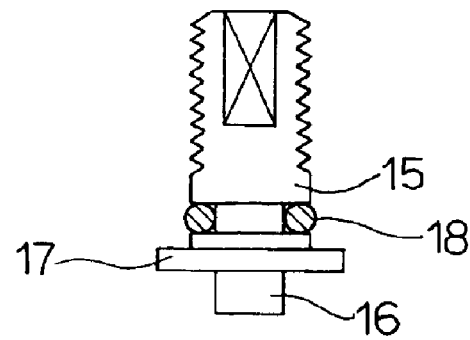
FIG. 7 is a front view illustrating a stem part.
Figure 8:
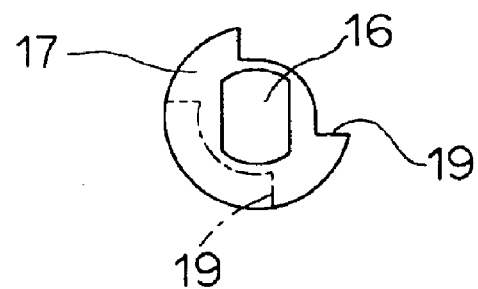
FIG. 8 is a bottom view of FIG. 7.

FIG. 3 is intended to illustrate an example of providing the body in the interior thereof with a stopper mechanism for a handle. With reference to this diagram, burring work is performed on the stem-inserting hole 5 to form a tubular part 11 of a small length and a stopper piece 13 integrally projecting from part of this tubular part 11. Meanwhile, a notched groove 19 for regulating rotation is formed in the flange part 17 provided for the stem 15 as illustrated in FIG. 8, and the ball 12 is disposed so as to have the rotation thereof regulated to an angle of about 90 degrees by a stopper mechanism formed by meshing the stopper piece 13 and the notched groove 19. Then, by allowing an O-ring 18 inserted in a fitting groove 15a of the stem 15 to contact the inner peripheral face of the tubular part 11 as illustrated in FIG. 2, the ball valve can be infallibly sealed with a compact structure. Further, by forming a stepped part 20 on the upper edge part of the tubular part 11 and fitting a washer 23, a gland 43 and gland packing 42 at the stepped part 20 as illustrated in FIG. 6, the stem 15 can retain the sealing property and increase the torque performance of torque. In this case, the operating torque of the handle may be relied on to disperse the force exerted on the stopper mechanism and prevent the stopper mechanism from being deformed by providing the flange part 17 with two notched grooves 19 indicated with a chain line, and meshing these notched grooves 19 and the two stopper pieces 13 as illustrated in FIG. 8.

Now, one example of the method for producing the ball valve in this invention will be described specifically below with reference to the drawings.

With reference to FIG. 1, the body 2 furnished with the forcing retaining part 3 of an approximately hexagonal shape is formed by cutting the pipe 1 in a predetermined length and subjecting the opposite parts of the pipe 1 to plastic processing resorting to the work of flaring.

The process of seat shaping and perforation is carried out by drawing the approximately central position of the body 2, thereby forming the seat-shaping part 4 and perforating the seat-shaping part 4, thereby forming the stem-inserting hole 5. Subsequently, burring work is performed on the stem-inserting hole 5 Due to this burring work, the tubular part 11 and the stopper piece 13 produced by projecting part of the tubular part 11 are formed.

Then, one of the pair of annular inserting members 6 similar in shape to the forcing retaining part 3 is forced into the body 2 through one side thereof, and thereafter the ball 12 is non-rotatably joined to the lower terminal end of the stem 15 inserted in the stem-inserting hole 5 as illustrated in the same diagram. In this case, the notched groove 19 for regulating rotation to an approximate angle of 90 degrees is formed in the flange part 17 provided for the stem 15, and the stopper piece 13 is meshed with the notched groove 19 and incorporated in such a manner in the body as to regulate the rotation of the ball 12. Further, the other inserting member 6 is forced in through the forcing retaining part 3 on the other side of the body 2. Thereafter, the ball valve is produced by causing the seat rings 9 of the pair of inserting members 6, 6 to support the ball 12 rotatably with a predetermined tightening margin allowed for the ball 12 and, meanwhile, simultaneously beating the terminal face parts (diametrically contracted parts) 26 on both sides of the body 2 with jigs 47, thereby compression-forming the terminal face parts along the contour of the tapered part 7 of the inserting member 6. Thus, the ball 12 is supported on the seat rings 9 so as to retain the sealing property and the property of torque as predetermined.

Figure 4:
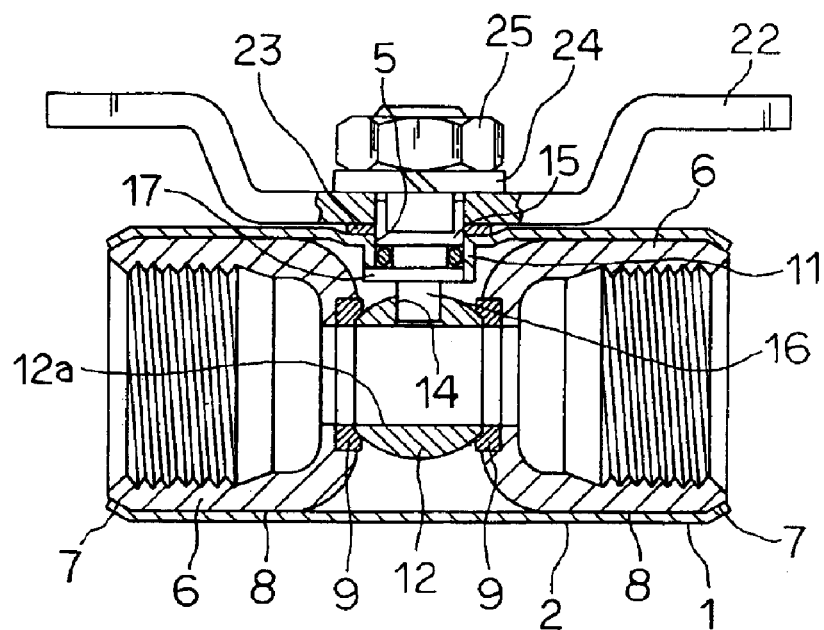
FIG. 4 is a cross section illustrating another example of the ball valve in the first aspect of this invention.
Figure 5:
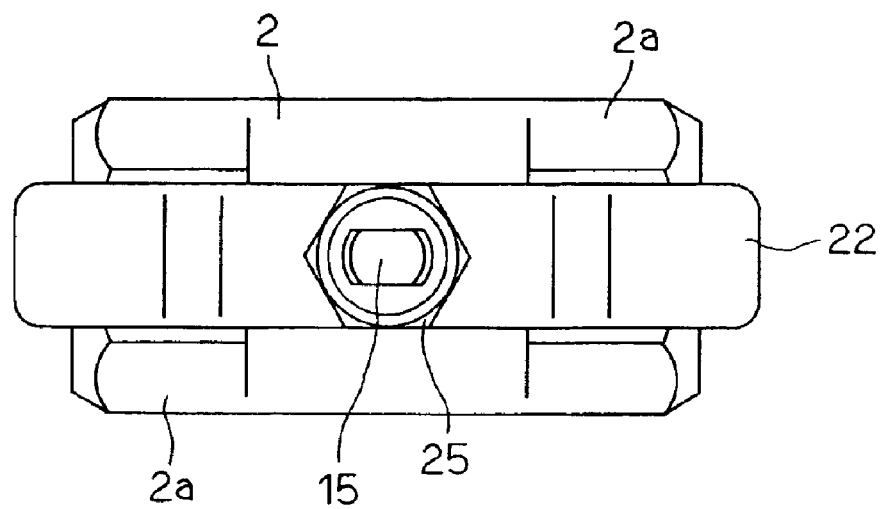
FIG. 5 is a plan view of FIG. 4.
Figure 9:
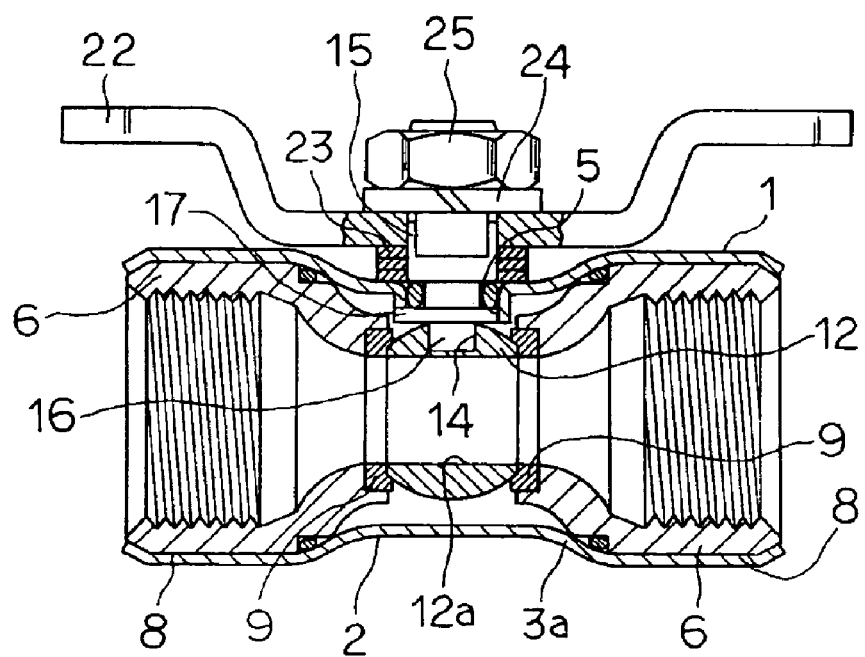
FIG. 9 is a cross section illustrating yet another example of the ball valve in the first aspect of this invention.
Figure 10:
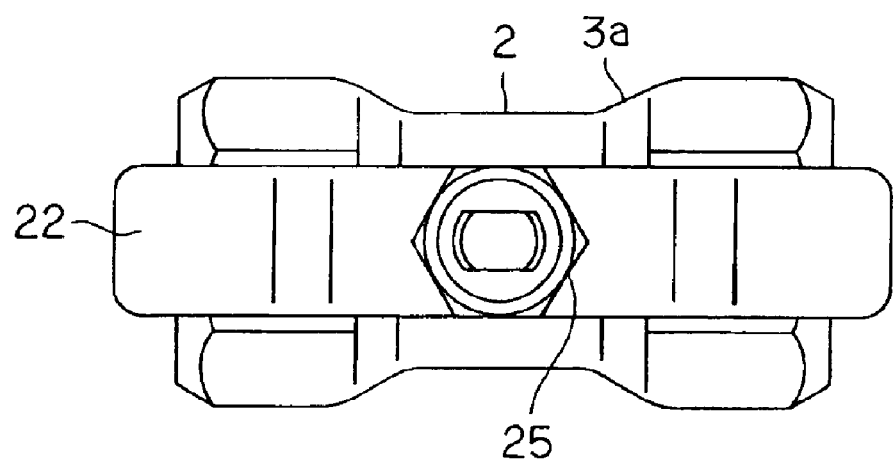
FIG. 10 is a plan view of FIG. 9.

The ball valve using the body 2 of such a straight type as illustrated in FIG. 2 and FIG. 4 is produced through the process described above. In the process involving a flaring step as illustrated in FIG. 9, the body 2 is formed in the shape illustrated in FIG. 9 by first circularly flaring the opposite side parts of the pipe 1 and then flaring them in a hexagonal shape. The rest of this process is identical with the preceding process.

In the embodiment of the ball valve of this invention, since the construction of the ball valve varies with the bore size (ball port diameter), it is proper to apply the construction illustrated in FIG. 2 to the ball valve of a full port type and the construction illustrated in FIG. 4 to the ball valve of a reduced port type.

FIGS. 11 through 19 depict a method for producing a ball valve contemplated in the second aspect of this invention.

Like parts used in the ball valve and the method for production thereof in the present aspect of this invention and in the preceding aspect of the invention will be denoted by like reference numerals and will be omitted from the following description.

Figure 12:
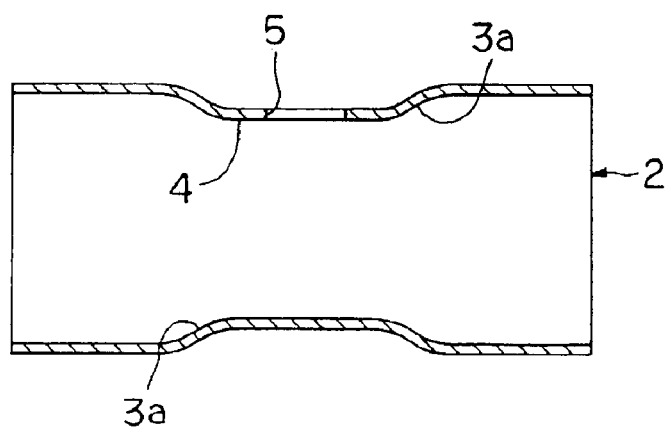
FIG. 12 is a cross section illustrating, in a contracted diameter, the neighborhood of the central part of the pipe of FIG. 11.
Figure 13:
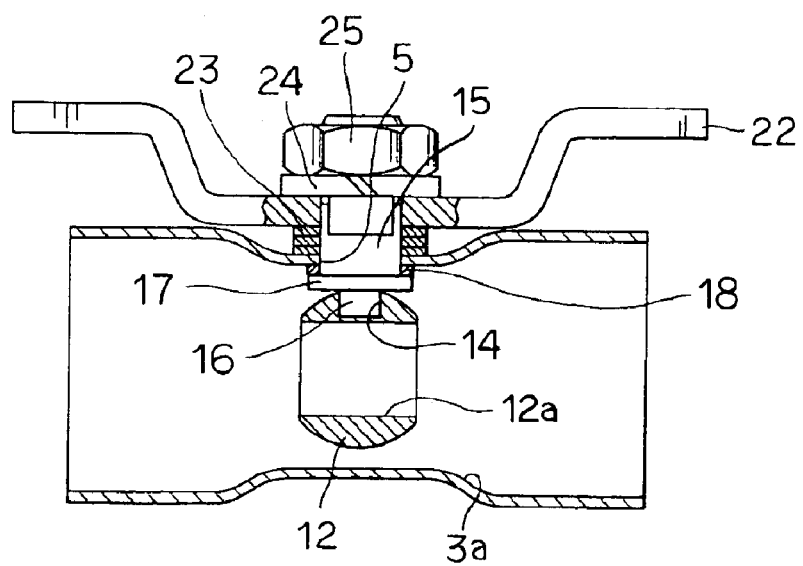
FIG. 13 is a cross section illustrating the state of the pipe of FIG. 12 having internal parts incorporated therein.

In FIG. 12, is a seal retaining part 3a is formed in a tapered shape in the pipe 2 at an approximately central position thereof by plastic processing such as swaging or press working. The seat-producing parts 4 are formed in a planar shape as by drawing one each on the outside and inside of the pipe 1 at a position close to the seal-retaining parts 3a, and the stem-inserting hole 5 is formed as well in the area inside the seat-producing part 4.

Now, the ball valve and the method for production thereof contemplated by the second aspect of this invention will be described below.

Figure 11:
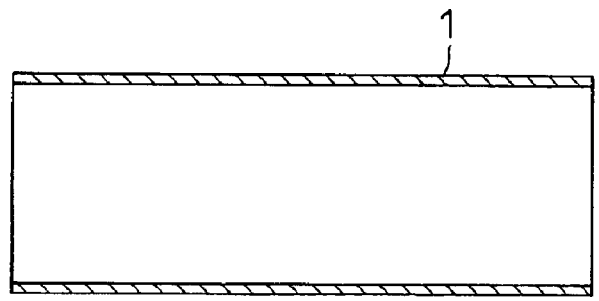
FIG. 11 is a cross section of a tube having a predetermined length, illustrating one example of a process for the production of a ball valve in the second aspect of this invention.

First, the pipe 1 is cut to obtain a length thereof needed to form the body 2 of ball valve as illustrated in FIG. 11. Then, the pipe 1 is diametrically contracted in the neighborhood of the central part thereof as illustrated in FIG. 12 to form the seal-retaining parts 3a, 3a having a tapered shape. The seat-producing parts 4 having a planar shape are formed in the central part of the pipe 1 at positions close to the seal-retaining parts 3a, 3a, and the stem-inserting hole 5 in a circular shape is formed by punching in the area inside the seat-producing part 4.

Then, the stem 15 is inserted into the stem-inserting hole 5 from the inner side of the body 2 and, at the same time, the ball 12 is inserted into the pipe 1 from either of the sides thereof, with the stem-inserting face 14 held in the direction parallel to the flow path so as to retain the projecting part 16 of the stem 15 as joined in a non-rotary state to the stem-inserting face 14.

Figure 14:
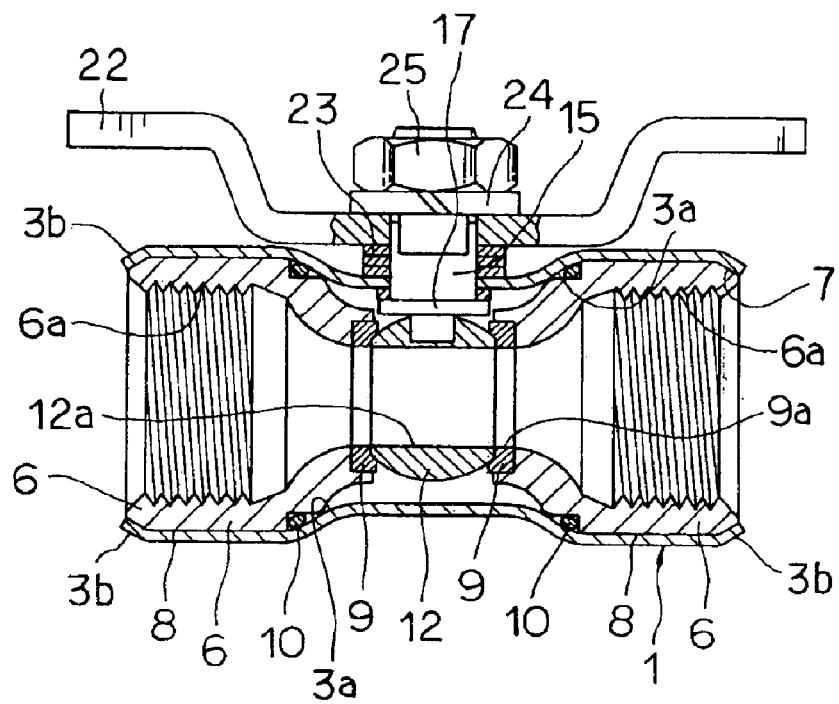
FIG. 14 is a cross section illustrating a ball valve in the second aspect of this invention.

The seat rings 9, 9 and the sealing members (O-rings) 10, 10 are respectively fitted in the insert members 6, 6 as illustrated in FIG. 14. The insert members 6, 6 are inserted into the pipe 1 from the opposite terminal ends thereof until the seat rings 9 which are the leading terminal parts of the inserting members 6 receive and support the ball 12 rotatably from opposite sides The sealing members 10 are incorporated in such a state as to contact the seal-retaining parts 3a closely to complete a seal.

Subsequently, outer seal-retaining parts 3b, 3b are formed in a tapered shape by diametrically contracting or compressing the pipe 1 by swaging or press working so as to substantially align the through hole 9a of the seat ring 9 with the through hole 12a of the ball 12 and so that the inserting members 6, 6 and the pipe 1 are joined.

Since the seal-retaining parts 3b are formed closely along the contour of the tapered parts 7 of the inserting members 6, they exert a wedging effect on the inserting members 6, 6 and move the inserting members 6, 6 slightly toward the ball 12, with the result that the pair of seat rings 9, 9 are accurately positioned because their mutual distance is adjusted to the predetermined magnitude. When the sealing members 10, 10 are made to depress the inner seal-retaining parts 3a, 3a, the inserting members 6 are aligned more accurately because the wedging effect of the tapered shape of the inner seal-retaining members 3a, 3a exerts a force in the axial direction on the inserting members 6.

It would be advantageous to perform the work of diametrical contraction or compression on the entire periphery of the outer seal-retaining parts 3b along the contour of the tapered parts 7 thereof. So long as each outer seal-retaining part 3b is disposed at least at one place along the contour of the tapered parts 7, the sealing property between the inserting members 6 and the body 2 can be retained because the sealing members 10, 10 are moved toward the ball 12 and brought into contact with the inner seal-retaining parts 3a, 3a. The process described above is preferably automated with proper means, such as jigs. Further, the tapered parts 7 of the body 2, while the valve is in use, fulfill the function of preventing the inserting members 6 from being extracted out of the valve by the inner pressure.

The diametrical contraction can be effected by drawing up to a plurality of repetitions until the diameter is contracted to the predetermined magnitude. Since the division of the work into the plurality of parts manifests a function of increasing the strength of the part subjected to the diametrical contraction, it is effective in increasing the strength of the ball valve and enabling the inserting members 6, 6 to be positioned more accurately. The quantity of the diametrical contraction and the number of forming processes involved in this case may be properly decided liberally to suit the relevant operation to be performed.

Figure 15:
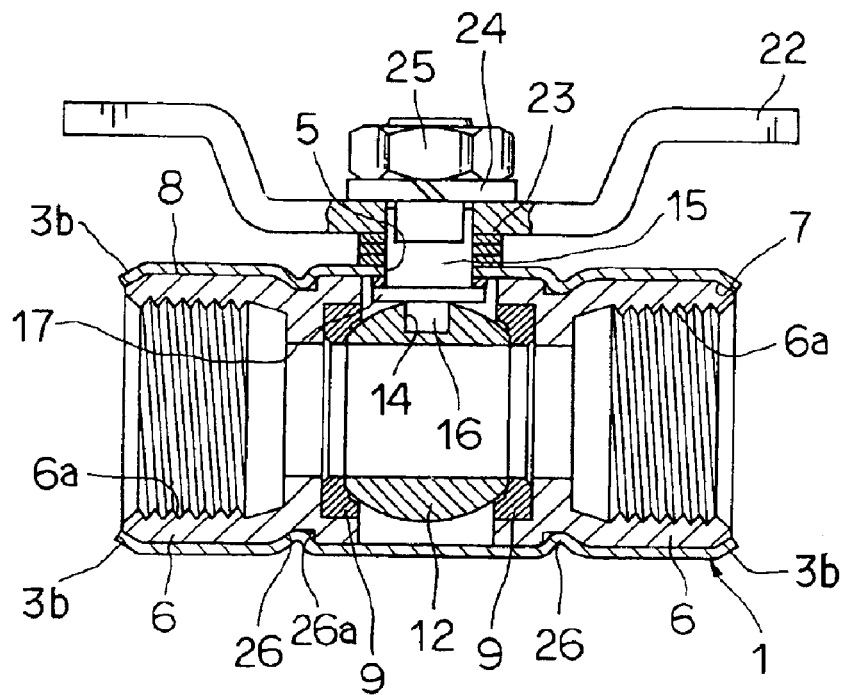
FIG. 15 is a cross section illustrating another example of the ball valve in the second aspect of this invention.
Figure 16:
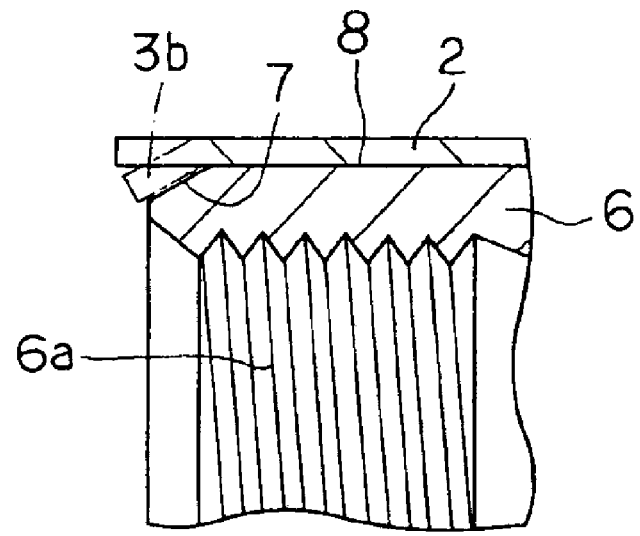
FIG. 16 is a partially magnified cross section of FIG. 14.

FIG. 15 is a cross section illustrating another example of a method for production of the ball valve contemplated by the second aspect of the invention. Like parts used in the present aspect of this invention and in the preceding aspect of the invention will be denoted by like reference numerals and will be omitted from the following description.

In the present example, the production is effected by a procedure which comprises preparing the pipe 1 by cutting the pipe to a predetermined length, forming the stem-inserting hole 5 in the approximately central position of the pipe 1, fitting an inserting member 6 having an annular shape in the inner periphery on one side of the pipe 1, diametrically contracting or compressing the pipe 1 until the inserting member is fixed to the pipe 1, and then inserting the stem 15 into the stem-inserting hole 5 and joining the ball 12 in a non-rotary state to the lower terminal of the stem 15 as well.

The procedure further comprises fitting a second inserting member 6 of an annular shape to the inner periphery on the other side of the pipe 1, causing the pair of inserting members 6, 6 to receive and rotatably support the ball 12, and further diametrically contracting or compressing the pipe 1 toward the inserting member 6 inserted into the interior of the pipe 1 on the other side until the inserting members 6 and the pipe 1 are joined. During the course of the diametrical contraction or compression, the diametrically contracted parts 26 formed by diametrically contracting the pipe 1 are meshed with depressed parts 26a disposed at proper positions along the outer periphery of the inserting members 6, 6 to fix the inserting members 6, 6 to the pipe 1 to prevent them from rotating.

Figure 17:
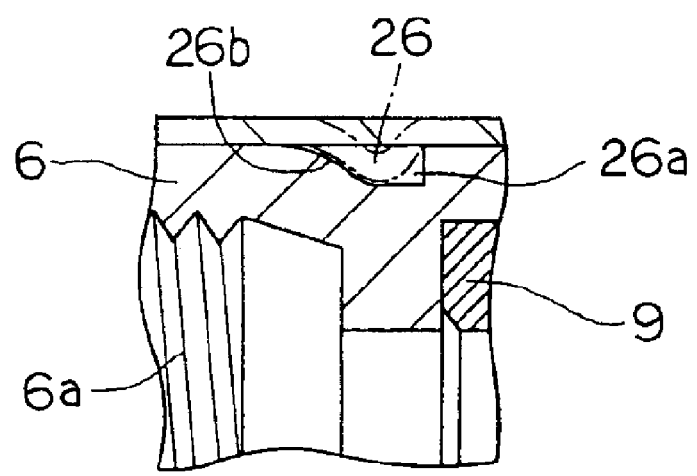
FIG. 17 is a partially magnified cross section of FIG. 15.

The depressed parts 26a are each in the form of a notched depression having a slope 26b of a proper angle on the tube-connecting part (outer) side of the inserting member 6, and a substantially vertical wall on the ball 12 side as illustrated in FIG. 17.

By diametrically contracting or compressing the neighborhood of either of the terminal parts of the pipe 1 and then similarly diametrically contracting or compressing the neighborhood of the other terminal part, it is possible to move the inserting members 6, 6 by the wedging effect toward the ball 12 and bring the seat ring 9 as aligned axially into tight contact with the ball 12.

In the embodiment of the ball valve of this invention, the ball valve is varied in construction with the bore size (ball port diameter) thereof. It is advantageous to adopt the construction illustrated in FIG. 15 for the ball valve of a full port type as in the present example, and adopt the construction illustrated in FIG. 14 for the ball valve of a reduced port type.

Figure 18:
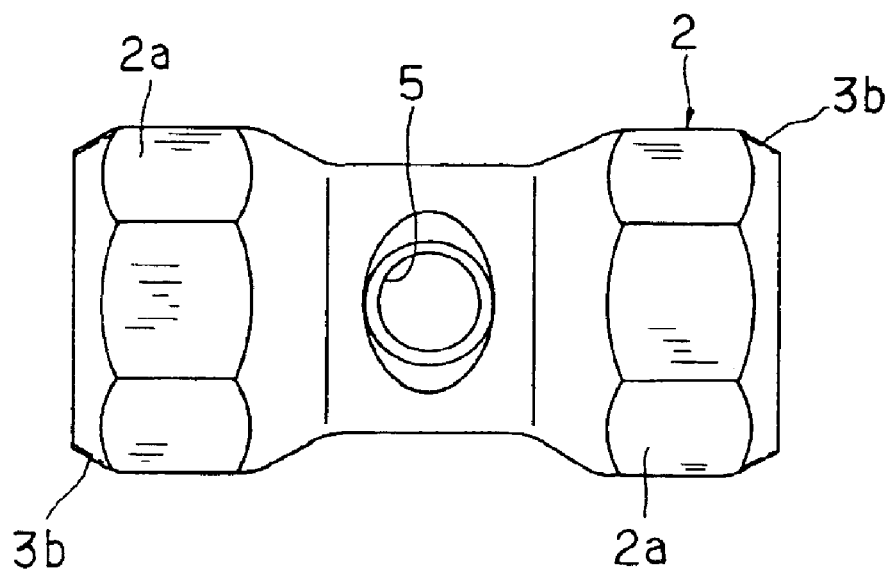
FIG. 18 is a plan view of the body of FIG. 14.
Figure 19:
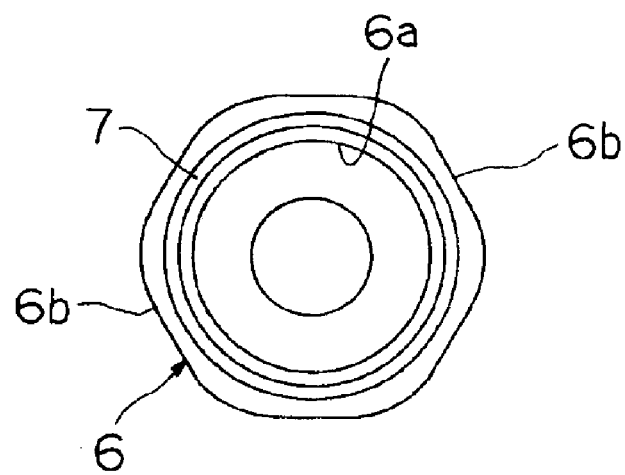
FIG. 19 is a cross section of the insert members of FIG. 16.

In either of the first and second aspects of this invention, by providing the inserting members 6, 6 to be inserted each at the opposite terminal portions thereof with mutually parallel external flat parts 6b formed in an approximately hexagonal shape as illustrated in FIG. 19, or with mutually parallel external flat portions formed at places of an even number of not less than two prior to the diametrical contraction or compression of the outer periphery of the body 2, it is made possible to form mutually parallel handle parts 2a in the neighborhood of the opposite terminals of the body 2 as illustrated in FIG. 3 and FIG. 18 and enable the handle parts 2a to be fixed with a fixing jig, such as a wrench, and utilized for performing the tube fitting.

FIGS. 20 through 32 depict the ball valves and the methods for production thereof as contemplated by a third aspect of this invention.

Figure 21:
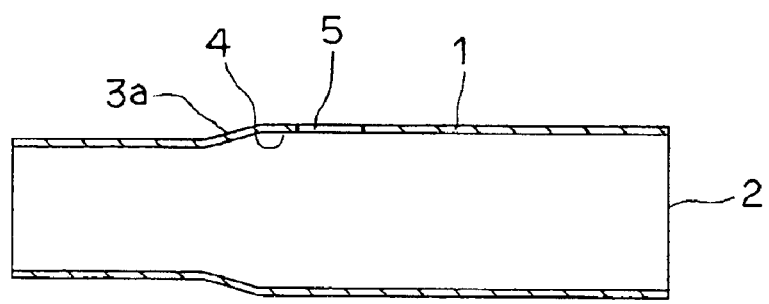
FIG. 21 is a cross section illustrating one side of the pipe of FIG. 20 in a diametrically contracted state.
Figure 22:
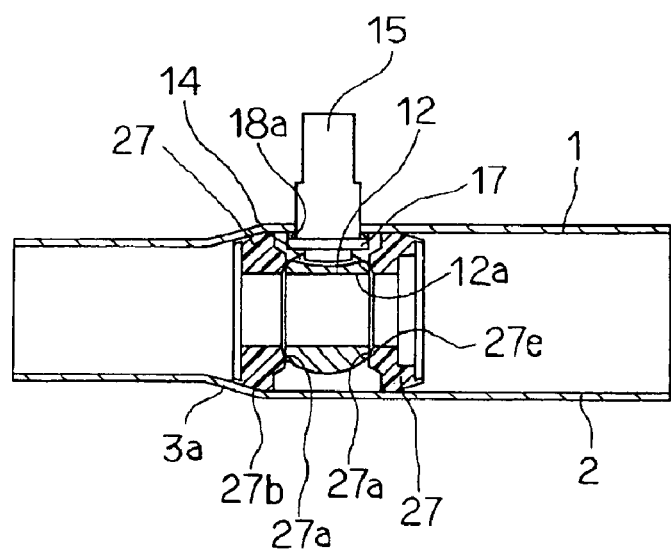
FIG. 22 is a cross section illustrating the pipe of FIG. 21 in a state having internal components incorporated therein.

In FIG. 21, a seal-retaining part 3a having a tapered shape is formed by diametrically contracting one of the opposite terminal parts (ends) of the pipe 2 by plastic processing, such as swaging or press working. The seat-shaping parts 4 having a planar shape are formed one each on the inside and the outside of the pipe 1 as by drawing at the close to the seal-retaining parts 3a and stopping the diametrical contraction, and the stem-inserting hole 5 is formed in the area inside the seat-producing parts 4.

Figure 24:
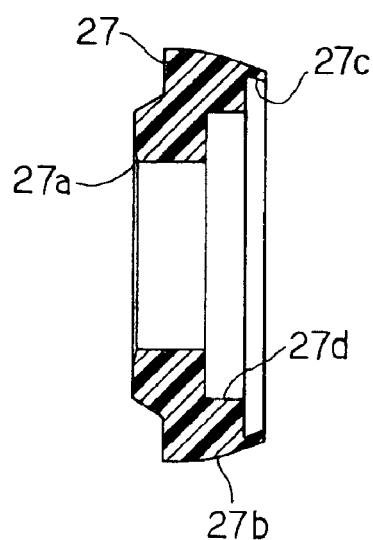
FIG. 24 is a magnified cross section of a seal ring in the third aspect of this invention.

In FIG. 24, an annular seal ring made of resin is intended to fulfill simultaneously the functions of a seat ring and a gasket of the body 2. The ball valve uses a pair of such seal rings 27 and they manifest the function of a gasket for closely sealing the angular parts on the inner periphery side with a sealing part 27a of the ball face and an outer periphery side 27b with the inner peripheral surface of the seal-retaining part 3a of the body 2.

Figure 25:
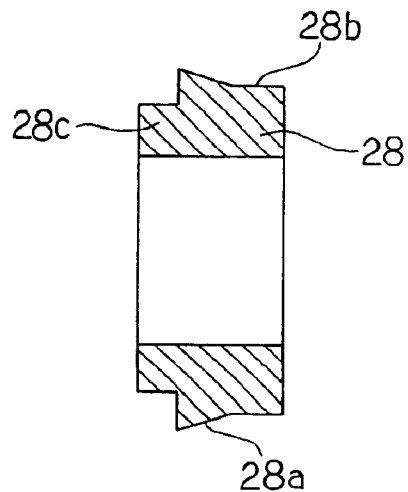
FIG. 25 is a magnified cross-section of an insert ring in the third aspect of this invention.

In FIG. 25, reference numeral 28 denotes an insert ring formed of metal in an annular shape. This insert ring 28 has formed on the outer peripheral surface thereof a tapered part 28a and a straight part 28b. This tapered part 28a, due to the wedge effect generated during the diametrical contraction of the pipe 1, increases the accuracy of positioning of the seal ring 27 relative to the ball 12.

Figure 26:
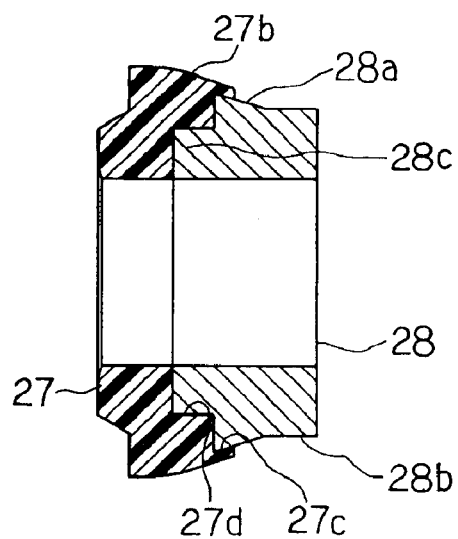
FIG. 26 is a magnified cross section illustrating the seal ring in a state having the insert ring incorporated therein

Then, the straight part 28b is endowed with the function of preventing the pipe 1 and the seal ring 27 from being deformed under the load of drawing during the diametrical contraction of the pipe 1. In this case, when the tapered part 28a of the insert ring 28 is fitted into a fitting part 27c formed in a conical cross section on the rear terminal face of the seal ring 27. At the same time, the insert ring 28 is aligned by fitting a projecting part 28c of the insert ring 28 to a stepped part 27d of the seal ring 27 as illustrated in FIG. 26, the seal ring 27 follows such motions until the seal ring 27 is incorporated in a concentric state in the ball valve.

Figure 27:
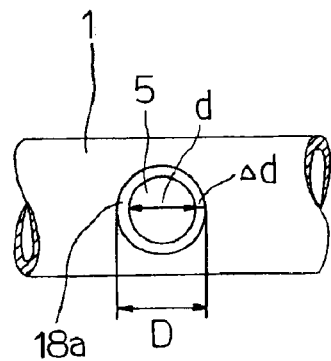
FIG. 27 is a partially cutaway plan view of the pipe, illustrating the relation between a stem-inserting hole and a thrust washer.

A thrust washer 18a is interposed between the flange part 17 and the seat-shaping part 4 both formed at the lower part of the stem 15. The diameter of this thrust washer 18a is set at the magnitude D that has an allowance in advance for the elliptic strain due to the diametrical contraction of the pipe 1 (d+Δd) (D>d+Δd) as illustrated in FIG. 27. This diameter is large enough to avoid hindering the smooth motion of the stem.

Figure 23:
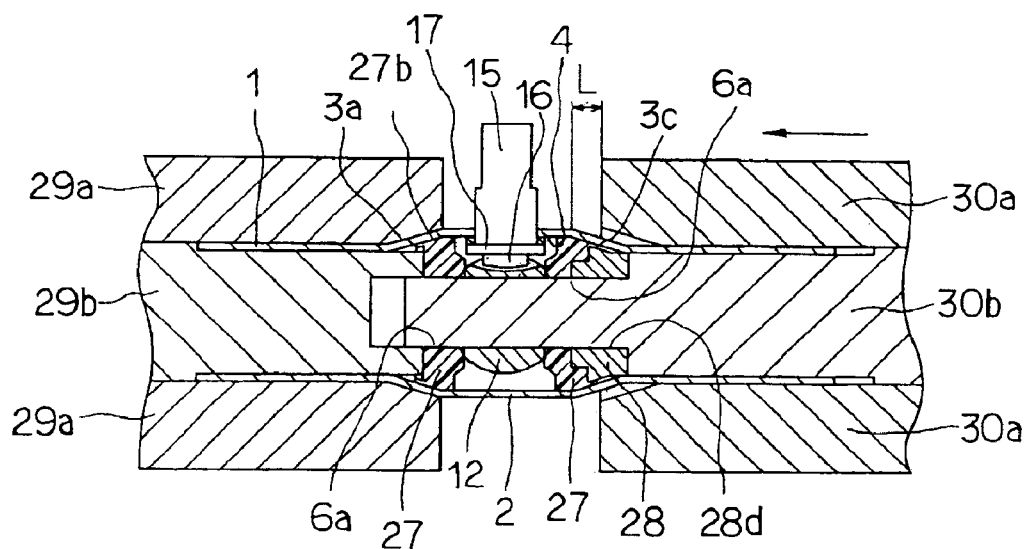
FIG. 23 is a cross section illustrating the pipe of FIG. 22 in a state being diametrically contracted with a jig.

With reference to FIG. 23, a first jig 29a is made to support the side of the seal-retaining part 3a formed at one of the terminal parts of the pipe 1, a second jig 29b is made to support the seal ring 27, and forming jigs 30a, 30b are disposed on the other terminal part side (end) of the pipe 1. With the first forming jig 30a pressing in the direction of the arrow, the pipe 1 is diametrically contracted by plastic processing, such as swaging or press working, and a seal-retaining part 3c is formed in a tapered shape. In this case, by pressing the forming jig 30a across a distance L, it is made possible to adjust the mutual distance of (distance between) the pair of seal rings 27, 27 to a predetermined magnitude and position the seal rings accurately.

Figure 28:
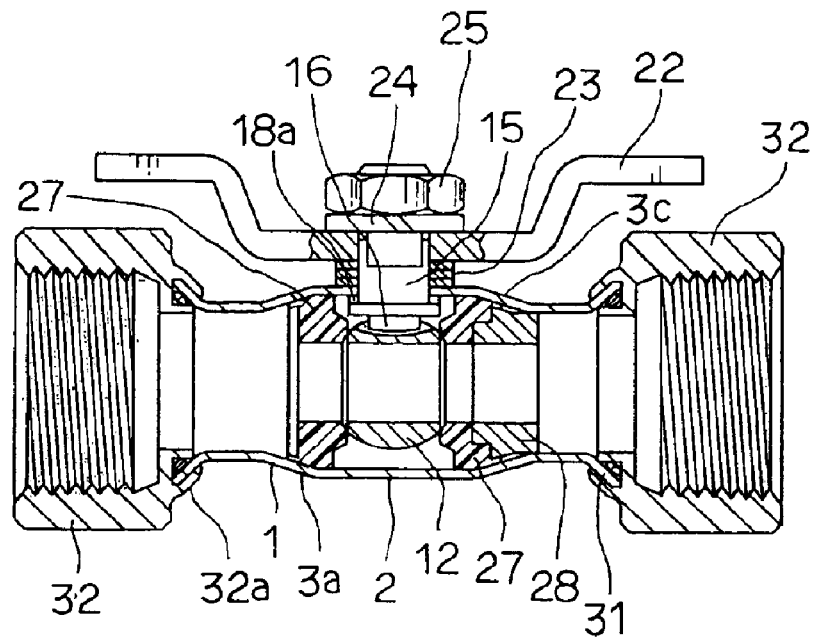
FIG. 28 is a cross section illustrating the ball valve of the third aspect of this invention in a state being provided with a rotatable cap nut.
Figure 29:
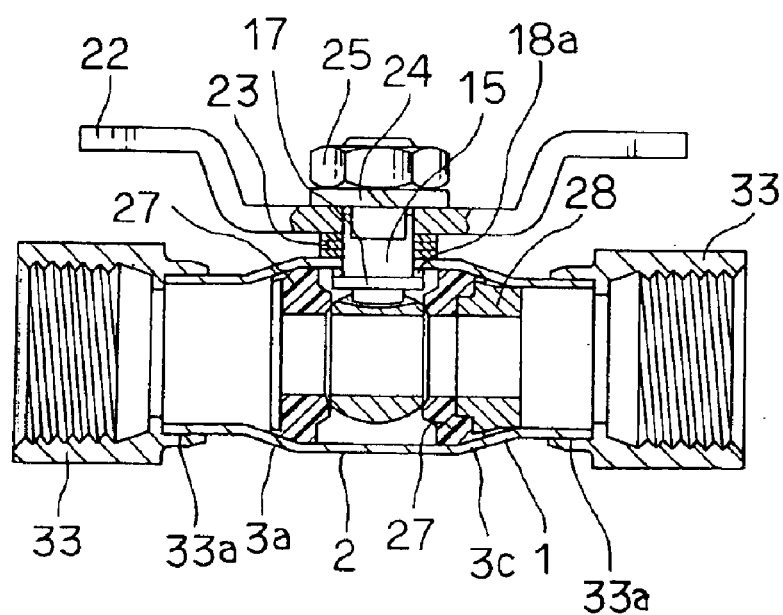
FIG. 29 is a cross section illustrating the ball valve of the third aspect of this invention in a state being provided with a soldered cap nut.

With reference to FIG. 28 and FIG. 29, reference numeral 22 denotes the handle. This handle 22 is attached in a non-rotary state to the stem 15 and is provided with a stopper adapted to stop the handle rotation at angular intervals of about 90 degrees, and is fixed by tightening with the nut 25 through the spring washer 24 and a washer 23 which are disposed respectively on and beneath the handle 22.

Figure 32:
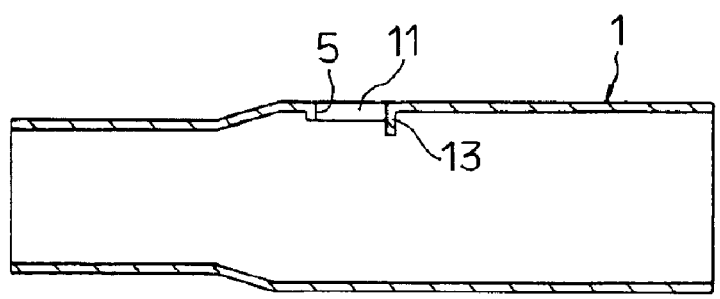
FIG. 32 is a diagram illustrating another example of the body shown in FIG. 21 in the third aspect of this invention.

As another example, the provision of a stopper mechanism similar to the preceding aspects of the invention is conceivable. To be specific, the stem-inserting hole 5 is subjected to burring work to form the tubular part 11 having a short length and a stopper piece 13 projecting integrally from part of the tubular part 11 as illustrated in FIG. 32. Meanwhile, the notched groove 19 for regulating rotation is formed in the flange part 17 and, due to the stopper mechanism obtained by meshing the stopper piece 13 with the notched groove 19, the ball 12 is disposed so as to have the rotation thereof regulated at an angle of about 90 degree. Further, by setting the washer 23, a gland 43 and gland packing 42 in the upper edge part of the tubular part 11 as illustrated in FIG. 6, the stem 15 can retain the sealing property and enjoy an improvement in the property of torque.

FIGS. 28 through 31 depict varying examples of the joining parts which are formed at the opposite terminal parts of the ball valve contemplated by the third aspect of this invention.

FIG. 28 illustrates a construction produced by forming flared parts 31 one each at the opposite terminal parts (ends) of the pipe 1, causing the leading (inner) terminal projecting parts 32a of cap nuts 32, 32 to abut the flared parts 31, and slanting the leading terminal projecting parts 32a of the cap nuts 32, 32 as by roller pressing until these parts closely contact the flared parts 31.

Figure 30:
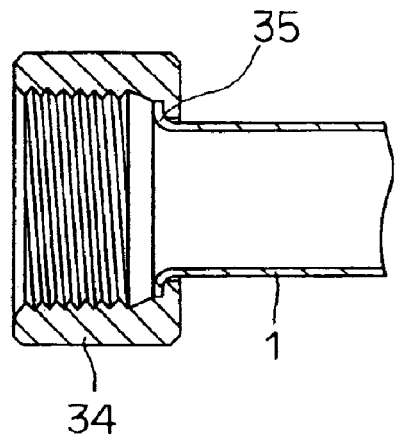
FIG. 30 is a cross section illustrating the pipe provided at the terminal thereof with a cap nut fitted thereto by the work of flaring.

FIG. 29 illustrates a construction produced by inserting the cap nuts 33 into the opposite terminal parts (ends) of the pipe 1 and joining them by welding 33a, such as soldering. FIG. 30 illustrates an example of the construction produced by having the cap nuts 34 incorporated in advance in the opposite terminals of the pipe 1, then flaring the opposite terminal parts of the pipe 1 to form diametrically expanded parts 35, and allowing the cap nuts 34 to be disposed rotatably at the positions of union as illustrated in the diagram.

Figure 31:
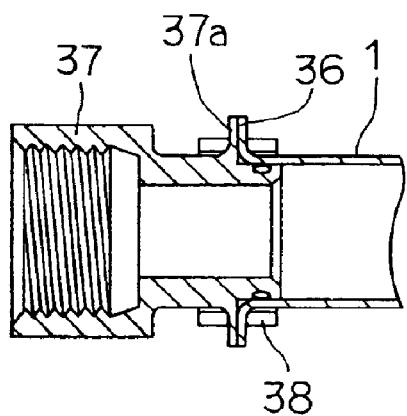
FIG. 31 is a cross section illustrating one example of providing the pipe at the terminal thereof with a joining part.

FIG. 31 illustrates a construction produced by flaring the opposite terminal parts of the pipe 1 at an approximately right angle to form engaging parts 36, and joining fitting parts 37a of adjoining members 37 and the engaging parts 36 with special clamps 38.

Now, one example of the method for production of the ball valve contemplated by the third aspect of this invention will be described.

Figure 20:
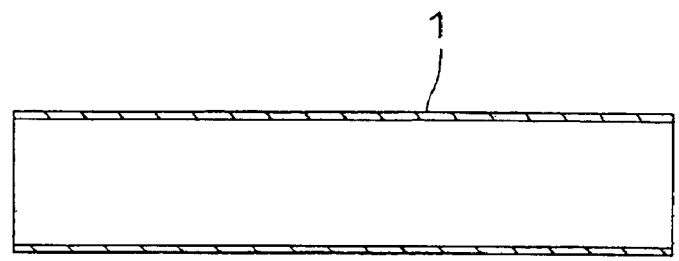
FIG. 20 is a cross section of a pipe having a predetermined length, illustrating one example of the process for the production of a ball valve in the third aspect of this invention.

For a start, the pipe 1 is cut in a length for forming the body 2 of the ball valve as illustrated in FIG. 20. Then, the seal-retaining part 3a is formed in a tapered shape by diametrically contracting one of the terminal parts (ends) of the pipe 1, the seat-shaping part (i.e., seat) 4 having a planar shape is formed in the central part of the pipe 1 at a position close to the seal-retaining part 3a, and the stem-inserting hole 5 is formed in a circular shape by performing a punching work in the area inside the seat-producing part 4 as illustrated in FIG. 21.

Thereafter, the seal rings 27 are inserted into the pipe 1 and set at the positions of the seal retaining parts 3a. In this case, the seal rings 27 manifest the function of a gasket to the body 2 by having the outer (external) peripheral surface 27b thereof tightly seal the inner (internal) peripheral surfaces of the seal-retaining parts 3a.

The stems are inserted into the stem-inserting hole 5 from the inside of the body 2 with the thrust washers 18a retained on the flange parts 17 of the stems 15 and, at the same time, the ball 12 is inserted in the direction making the stem-fitting surfaces 14 thereof parallel with the flow path into the pipe 1 from the side thereof not yet diametrically contracted until the projecting parts 16 of the stems 15 are connected in a non-rotary state to the stem-fitting surfaces 14. Then, the ball 12 will collide against the seal rings 27 in a slightly resilient state. In this case, the seal rings 6 simultaneously fulfill the functions of a seat ring and a gasket and contribute to the reduction of the number of component parts of the ball valve.

Then, the other of the pair of seal rings 27 is inserted into the pipe 1 from the side thereof not yet diametrically contracted (second side) and, at the same time, the insert ring 28 is inserted into the pipe 1 until the tapered parts 28a of the insert rings 28 are meshed with the fitting parts 27c of the seal rings 27 as illustrated in FIG. 23. The various steps of the process described above are preferably properly automated to suit the particular construction.

Thereafter, the forming jigs 30a and 30b are set on the other terminal part side of the pipe 1, with the jig 29a supporting the seal-retaining part 3a formed in the first opposite terminal part of the pipe 1 and the jig 29b supporting the seal ring 27 as illustrated in FIG. 23. The forming jig 30b fulfills the function of supporting the rear (outer) end of the insert ring 28 and, at the same time, inserting the jig leading end into through hole 28d of the insert ring 28, through holes 27e of the seal ring 27, and through holes 12a of the ball 12 so as to align and support the relevant members.

Then, with the forming jig 30a pressing in the direction of the arrow, the pipe 1 is subjected to plastic processing, such as swaging or press working, to be diametrically contracted and, at the same time, the seal-retaining part 3c of a tapered shape is formed. In this case, by pressing the forming jig 30a across a distance L, it is possible to move the insert ring 3a and the seal ring 27 slightly toward the ball 12 due to the wedging effect generated during the formation of the seal-retaining parts 3c having a tapered shape, and to adjust the mutual distance of (distance between) the pair of seal rings 27, 27 to a predetermined magnitude and position the seal rings accurately.

The diametrical contraction involved at varying steps mentioned above may be effected by drawing up to a plurality of repetitions until the diameter is contracted to the predetermined magnitude. Since the division of the work into the plurality of parts manifests a function of increasing the strength of the part subjected to the diametrical contraction, it is effective in increasing the strength of the ball valve and enabling the parts of the seal rings 27 and the insert rings 28 to be positioned more accurately. The quantity of the diametrical contraction and the number of forming processes involved in this case may be properly decided liberally to suit the relevant operation to be performed.

FIG. 32 depicts another example of the body 2 shown in FIG. 21. It represents the case of burring the stem-inserting hole 5 illustrated in the first and the second aspect of this invention to form a stopper mechanism for the stem (handle) inside the body. The other component parts of the present construction are similar to those of the preceding example.

One example of the ball valve contemplated by yet another aspect of this invention will be described below. The present example can be applied to other aspects than the first through third aspects of the invention. Like parts will be denoted by like reference numerals and omitted from the following description.

Figure 33:
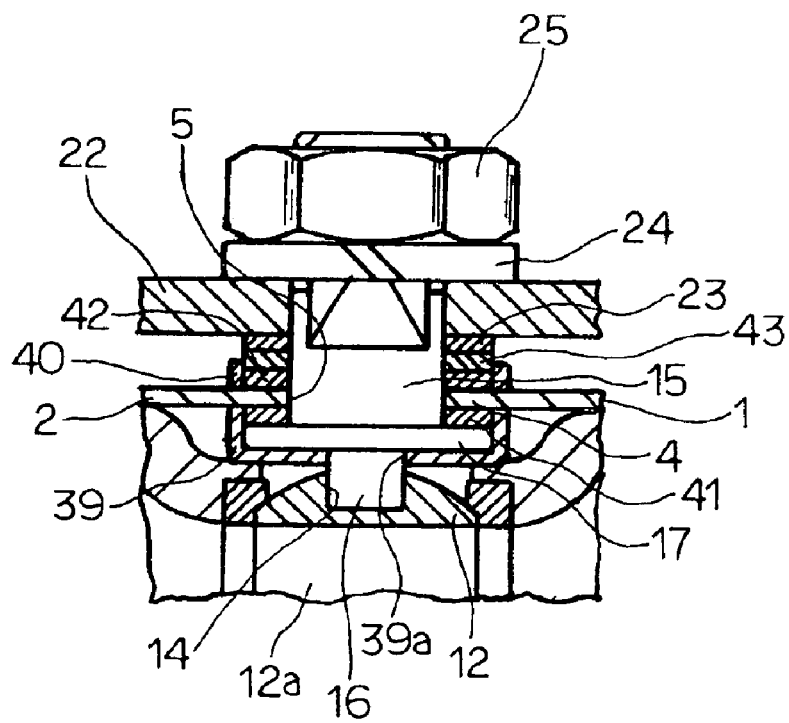
FIG. 33 is a partially magnified cross section illustrating another example of the construction for sealing the stem in this invention.

In FIG. 33, reference numeral 1 denotes a pipe. This pipe 1 is a pipe of a thin-wall type made of copper alloy or stainless steel. Alternatively, the pipe 1 may be produced by shaping a steel plate in the form of a roll and then joining the opposed ends of the roll by such means as welding, thereby imparting a cylindrical form thereto. This pipe 1 is cut in a predetermined length, namely the length for forming a valve box of a prospective ball valve, the opposite terminals of the length of the pipe 1 are burred, and subsequently plastic processing is performed on the opposite terminal parts of the pipe 1 to form the body 2 of the ball valve. A retaining vessel 39 furnished with an angular through hole 39a for non-rotatably receiving the stem 15 and a retaining ring 40 are formed of a thin plate material by plastic processing, casting, hot forging or injection molding. Then, the flange part 17 of the stem 15 to be inserted into the stem-inserting hole 5 of the body 2 is placed in the retaining receptacle 39, a thrust washer 41 is formed in the retaining vessel 39 on the upper side of the flange part 17, and this thrust washer 41 is interposed between the rear side of the seat-shaping part (seat) 4 of the body 2 and the flange part 17 as illustrated in the diagram. Meanwhile, the gland packing 42 inserted into the retaining ring 40 is positioned on the upper side of the seat-shaping part 4 and set in the stem 15, and the nut 25 is helically fitted to the stem 15 and then fixed by tightening through the gland 43 and the washer 23.

The construction thus obtained provides such advantages as preventing the thrust washer 41 and the gland packing 42 from being deformed or fractured while in service, increasing the sealing effects thereof, and enabling them to withstand protracted use without being affected by the characteristic properties (temperature and pressure) of a fluid.

Figure 34:
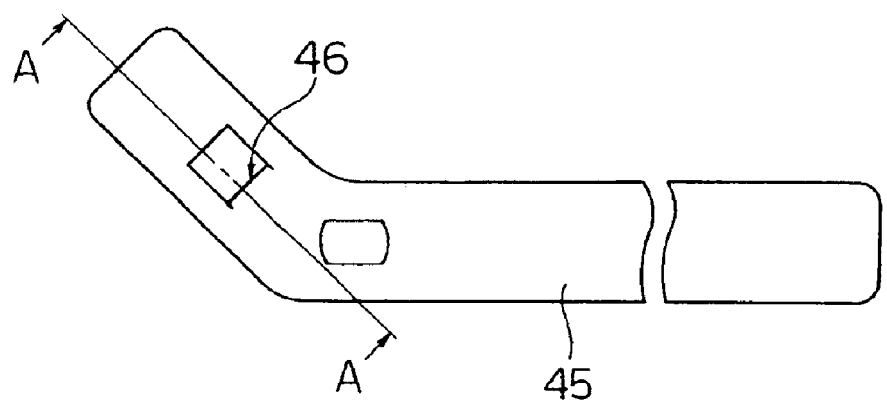
FIG. 34 is a partially cutaway plan view illustrating another working example of the handle.
Figure 35:
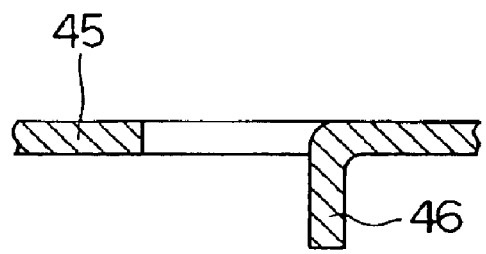
FIG. 35 is a magnified cross section taken through FIG. 34 along line A—A.
Figure 36:
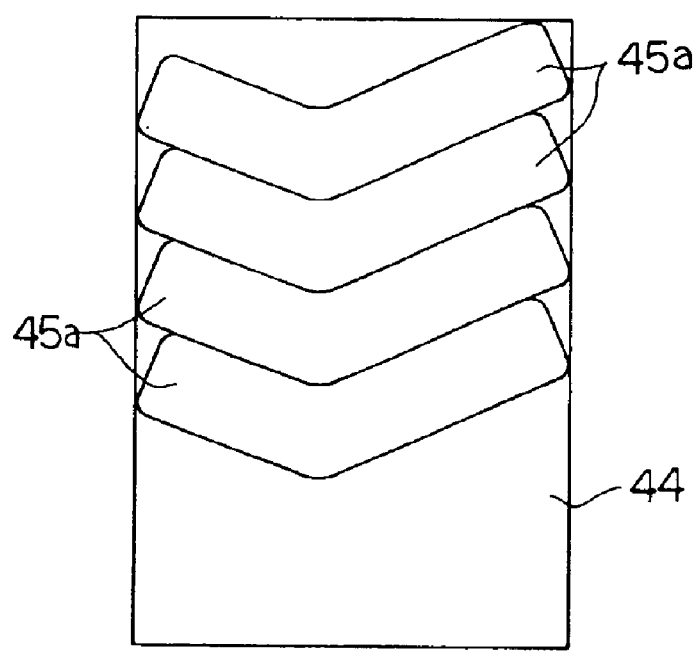
FIG. 36 is a referential plan view depicting the work of forming a semi-finished product of a handle by stamping from a plate material.

FIG. 34 depicts another example of the handle that can be applied to the various aspects of this invention even when the body is not provided therein with a stopper mechanism for the handle. This handle is produced by deriving. an intermediate portion 45a for a handle 45 from a plate material 44 by punching and forming a stopper projecting piece 46 in the intermediate portion 45a by plastic processing.

This handle enjoys a great practical value because it yields no waste material, manifests an effect of allowing mass production and contributes to the reduction of cost.

INDUSTRIAL APPLICABILITY

The ball valve and the method for production thereof contemplated by this invention as described above are suitable for such a ball valve as is set in piping for cold or hot water, air or gas, and is operated to open or shut or control the flow of the fluid. Since the ball valve of this invention weighs less than the conventional counterparts made by casting, it realizes a reduction in weight of the product and permits a great cut in the time spent for the production and allows quantity production of ball valves. As a result, the method of production of this invention permits a great decrease in the cost of production and allows provision of ball valves highly excelling in economy. Though this invention is directed toward the ball valve and the method for production thereof, it may be suitably applied to the formation of bodies for valves, such as butterfly valves.

What is claimed is:

1. A ball valve comprising:
   a body formed of a predetermined length of pipe so as to have opposite end portions, said body having a centrally-located seat portion, a stem-inserting hole formed in said seat portion, and inner seal retaining parts formed at said stem-inserting hole;
   a stem inserted in said stem-inserting portion;
   a ball connected to a lower end of said stem so as to rotate with rotation of said stem; and
   a pair of annular insert members set at internal peripheries of respective opposite end portions of said body;
   wherein said body has an outer seal retaining part formed at each of said opposite end portions of said body by compressing or diametrically contracting said opposite end portions, each of said insert members being held between one of said outer seal retaining parts and a corresponding one of said inner seal retaining parts so that said pair of insert members rotatably support said ball.

2. The ball valve of claim 1, wherein said stem-inserting hole has a tubular part and a stopper projecting from said tubular part, said stem having a flange with a notched groove to mesh with said stopper so as to regulate rotation of said ball.

3. The ball valve of claim 2, wherein said tubular part has an upper edge with a stepped part, further comprising packing set against said stepped part.

4. The ball valve of claim 2, wherein said stem has a fitting groove, further comprising an O-ring arranged in said fitting groove, said fitting groove and said O-ring being arranged so that said O-ring contacts an internal peripheral surface of said tubular part.

5. The ball valve of claim 4, wherein said tubular part has an upper edge with a stepped part, further comprising packing set against said stepped part.

6. The ball valve of claim 1, wherein each of said insert members has an integral outer pipe-connecting portion so as to have a one-piece construction.

7. A method of producing a ball valve, comprising:
   cutting a pipe to a predetermined length;
   forming a centrally-located seat portion in the cut length of pipe;
   forming a stem-inserting hole in the seat portion of the cut length of pipe;
   diametrically contracting a central portion of the cut length of pipe at the stem-inserting hole so as to form inner seal retaining parts;
   inserting a stem through the stem-inserting hole;
   joining a ball to a lower end of the stem inserted through the stem-inserting hole so that the ball is rotatable with rotation of the stem;
   inserting a pair of insert members at internal peripheries of opposite end portions of the cut length of pipe;

compressing the opposite end portions of the cut length of pipe so as to form a body having an outer seal retaining part at each end portion so that each of the insert members is held between one of the outer seal retaining parts and a corresponding one of the inner seal retaining parts such that the pair of insert members rotatably support the ball.

8. The method of claim 7, wherein each of the pair of insert members is formed so as to have an integral outer pipe-connecting portion so as to have a one-piece construction.

* * * * *